United States Patent [19]

Obenland

[11] Patent Number: 4,499,788
[45] Date of Patent: Feb. 19, 1985

[54] FEEDING DEVICE HAVING ALTERNATIVELY CONNECTABLE SLIP-ON GEAR UNITS

[75] Inventor: Gerhard Obenland, Ilsfeld, Fed. Rep. of Germany

[73] Assignee: Dürr Automation + Fördertechnik GmbH, Fed. Rep. of Germany

[21] Appl. No.: 402,297

[22] Filed: Jul. 27, 1982

[30] Foreign Application Priority Data

Jul. 31, 1981 [DE] Fed. Rep. of Germany ....... 3130300

[51] Int. Cl.³ .............................................. F16H 37/00
[52] U.S. Cl. ........................................ 74/661; 464/49
[58] Field of Search ................ 74/661, 421 A, 606 R; 403/335, 336; 464/49, 55, 901

[56] References Cited

U.S. PATENT DOCUMENTS

| | | | |
|---|---|---|---|
| 1,189,925 | 7/1916 | Dexter | 464/49 |
| 1,676,242 | 7/1928 | Bartlett | 464/49 |
| 2,042,608 | 6/1936 | Lee | 464/49 |
| 2,489,642 | 11/1949 | Hesse | 464/49 X |
| 2,556,259 | 6/1951 | Dorris et al. | 74/411 |
| 2,587,365 | 2/1952 | Mize | 464/49 |
| 3,146,629 | 9/1964 | Schmitter et al. | 74/467 |
| 3,631,735 | 1/1972 | McCarty | 74/606 R |
| 3,952,544 | 4/1976 | Filter | 464/49 |

FOREIGN PATENT DOCUMENTS 2057437 6/1971 Fed. Rep. of Germany.
1803829 2/1978 Fed. Rep. of Germany ........ 74/661

OTHER PUBLICATIONS

Bergbau, 1959, No. 7, pp. 151-154, (German).
Der Kohlenkobel, 1946, p. 70, (German).

Primary Examiner—Lawrence J. Staar
Assistant Examiner—Dwight G. Diehl
Attorney, Agent, or Firm—Kenway & Jenney

[57] ABSTRACT

In order to simplify the construction and to accelerate the change-over of two drive units in the case of a feeding device having a drive shaft and two gear units each drivable by a motor, which gear units are able to be connected alternately to the drive shaft such that each may alternately rotate with the drive shaft independently of the other, it is suggested that both gear units are designed as slip-on gear units and have a driven hollow shaft, that the two ends of the drive shaft each have the hollow shaft of one of the two slip-on gear units mounted around them in a manner permitting relative rotation, that the gear units are secured against rotation about the axis of rotation defined by the drive shaft and that rotary couples are provided, such that one of the hollow shafts at a time is connected to the drive shaft such that the connected hollow shaft secured against rotation relative to the drive shaft.

7 Claims, 2 Drawing Figures

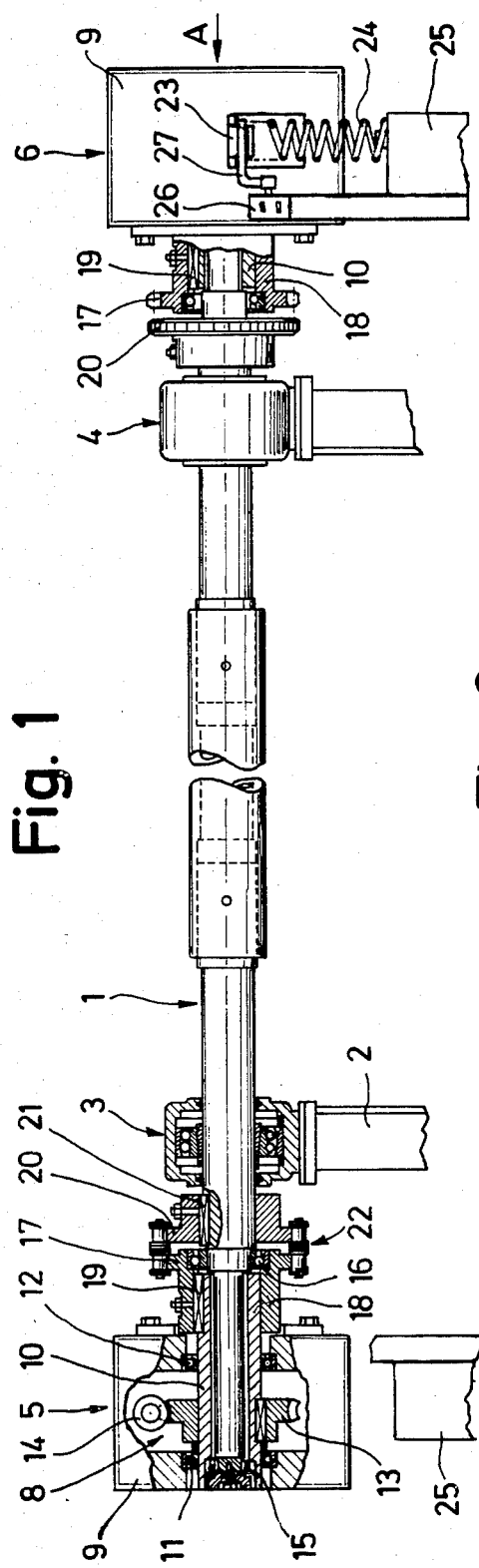
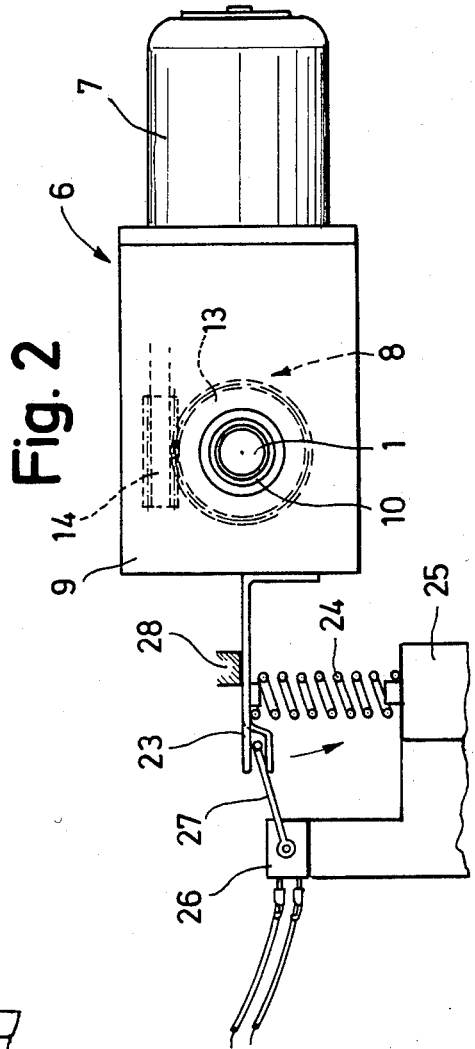

FEEDING DEVICE HAVING ALTERNATIVELY CONNECTABLE SLIP-ON GEAR UNITS

The invention relates to a feeding device comprising a drive shaft and two gear units each drivable by a motor, which gear units are able to be connected alternately to the drive shaft such that each may alternately rotate with the drive shaft independently of the other.

In the case of feeding systems, for example conveyor belts, block chain conveyors or lifting stations, drive is in general effected via a drive shaft, to which driving force is fed from an electric motor via a gear unit. In order to reduce interruptions during operation to a minimum, it is known to associate with such a drive shaft two gear units, each driven by its own motor, which gear units may be connected alternately to the drive shaft such that each may alternately rotate with the drive shaft independently of the other. If one of the drive units consisting of motor and gear unit fails, it is possible, and involves relatively little work, to connect the other drive unit to the drive shaft.

In the case of a known construction, for example, two drive units mounted next to the operating device are separately connectable to a sprocket wheel on the drive shaft via a chain connecting gear. When the main drive unit fails, the chain can be taken off and laid over the other drive unit via its corresponding sprocket wheel. The disadvantage of this construction is that the connecting gear chain has to be greased and therefore requires a great deal of maintenance. In addition, the connecting gear chain must be covered by a protective casing, which has to be removed before the chain is transferred to the other drive unit. The use of a chain connecting gear also requires the use of a chain tension device so that the construction work involved is quite considerable.

In the case of another known construction, the two drive units are mounted on the same base plate which is displaceably mounted substantially at right angles to the axis of the drive shaft. A spur gear is located on the drive shaft; both drive units have an output shaft with a spur pinion. By displacing the base plate, the spur gear on the drive shaft can mesh alternately with the spur pinion of either of the two drive units. In the case of this construction as well, greasing of the gear drive and covering of the same by means of a protective casing are absolutely necessary. A relatively large frame is required to accommodate the two drive units and this must also be displaceably mounted. In order to reduce the wear on the spur gears it is necessary to work with very narrow tolerances since this is the only way to guarantee that the spur gears meshing with each other operate free of play.

SUMMARY OF THE INVENTION

The object of the invention is to improve a feeding device of this type such that the change-over from one drive unit to the other can be carried out as quickly and easily as possible and that the construction of the driving gear is kept altogether simple. This object is solved for a feeding device of the type described at the beginning of this specification in that both gear units are designed as slip-on gear units and have a driven hollow shaft, the two ends of the drive shaft each have the hollow shaft of one of the two slip-on gear units mounted around them in a manner permitting relative rotation, the gear units are secured against rotation about the axis of rotation defined by the drive shaft, and rotary couples are provided, such that only one of the hollow shafts at a time is connected to the drive shaft such that the connected hollow shafts is secured against relative rotation with respect to the drive shaft.

With this construction according to the invention the drive shaft itself has a drive unit at each end, which comprises a slip-on gear unit with a driven hollow shaft. This hollow shaft is mounted for free rotation on the shaft end. Due to a rotationally fixed connection one hollow shaft of the two drive units can be connected at a time to the drive shaft so that it is secured against relative rotation with respect to the drive shaft. In order to change over from one drive unit to the other it is merely necessary to release the rotary couple of one hollow shaft from the drive shaft and engage the rotarly couple of other hollow shaft instead to the drive shaft.

It is advantageous to have each hollow shaft bearing a sprocket wheel, adjacent to each of which is a sprocket wheel having the same diameter and the same number of cogs and being mounted on the drive shaft such that it is secured against rotation relative to the drive shaft and to have a roller chain placed over the adjacent sprocket wheels to connect one hollow shaft and the drive shaft such that they are secured against relative rotation. This is preferably designed as a duplex chain.

It is advantageous to have each hollow shaft mounted on the end of the drive shaft by means of at least two ball bearings.

In a preferred embodiment the securing of each gear unit against relative rotation allows a limited rotation of the gear unit contrary to the action of an elastic pressure spring and a limit switch is provided for the motor associated with each gear unit, which is activated by the gear unit or a part rigidly connected to it when a specific rotation of the gear unit contrary to the action of the elastic pressure spring is exceeded due to a specific torque transmitted from the gear unit to the drive shaft being exceeded. Preferably, the gear unit is provided with an arm projecting at right angles to the axis of rotation of the drive shaft, a pressure spring being supported on this arm, this pressure spring extending substantially at right angles to the arm, its other end abutting on the frame of the machine; the limit switch is supported on the frame of the machine such that it is activated by the arm when a specific compression of the pressure spring is exceeded.

A particularly simple possibility of limit switching in the case of overloading is achieved due to the positioning, according to the invention, of the gear unit on the drive shaft itself.

It is advantageous for the end areas of the drive shaft, onto which the hollow shafts of the gear units are slipped, to have a smaller diameter than the remaining shaft.

The following description of preferred embodiments of the invention in conjunction with the drawings is intended to give a more detailed explanation.

BRIEF DESCRIPTION OF THE DRAWINGS

The drawings show:

FIG. 1 a side view, partially cut away, of a driveshaft, only partially illustrated, with drive units slipped on at both ends and FIG. 2 a view in the direction of arrow A in FIG. 1.

DETAILED DESCRIPTION OF THE PREFERRED EMBODIMENTS

The driving gear described in the embodiment is intended for a feeding device, for example a conveyor belt, block chain conveyor, lifting device or any other feeding device, which is driven by a drive shaft. This drive can, for example, be effected via a drive chain, which is guided on a sprocket wheel connected to the drive shaft so as to be secured against rotation relative to the drive shaft.

In the embodiment shown in FIGS. 1 and 2 the actual feeding device is not illustrated. Shown are the two ends of a drive shaft 1, which is mounted on a frame 2 by two ball bearings 3, 4 so as to be secured against rotation relative to the frame. The drive shaft 1 extends on both sides beyond the ball bearings 3 and 4 which are secured to the machine and the drive shaft end portions have a smaller diameter than the rest of the shaft.

A drive unit 5, 6 is slipped on to each end of the drive shaft, each drive unit comprising a motor 7 and a gear unit 8.

The gear unit 8 is disposed within a housing 9, in which a hollow shaft 10 is rotatably mounted by means of two ball bearings 11, 12 (FIG. 1). A worm gear 13 is secured to the hollow shaft by means of a wedge, this worm gear being connected to a drive worm 14 which is connected to the shaft of the motor 7 in a manner not shown in the drawing such that it rotates with the shaft.

The hollow shaft 10 is slipped over the end of the drive shaft 1 and rotatably mounted around this shaft. For this purpose a first ball bearing 15 is provided within the gear unit at the end of the shaft. A second bearing position results from a second ball bearing 16, which is disposed outside the housing 9 in the illustrated embodiment and the outer ring of which is located within a sprocket wheel 17, which is slipped onto the part of the hollow shaft 10 projecting beyond the housing 9 by means of a sleeve-like shaft 18. The sprocket wheel and hollow shaft are connected with each other by a wedge 19 so as to be secured against relative rotation.

The drive shaft 1 bears, immediately adjacent to the sprocket wheel 17, a sprocket wheel 20 which is fixed to the drive shaft by a wedge 21 so as to be secured against rotation relative to the drive shaft. The sprocket wheels 17 and 20 have the same diameter and the same tooth pitch.

Drive units of the type described are—as mentioned—disposed on both sides of the shaft so that pairs of sprockets formed by the sprocket wheels 17 and 20 are provided on both end portions of the shaft. A roller chain 22 can be laid over the two sprocket wheels of either such pair. This connects the two sprocket wheels 17 and 20 with each other so as to secure them against relative rotation. In the embodiment illustrated in FIG. 1 the chain is a so-called duplex chain, i.e. a chain which has two rollers next to each other on the same pin, the two rollers being separated from each other by stay pins. The rollers disposed next to each other engage in the recesses between the teeth of the adjacent sprocket wheels.

Whereas the one sprocket wheel pair couples the hollow shaft and the drive shaft via the chain 22 such that they are secured against relative rotation, the adjacent sprocket wheels on the opposite side of the shaft remain unconnected so that the drive shaft may be freely rotated relative to the hollow shaft.

The entire drive is, therefore, in this case undertaken by a single drive unit. It the other drive unit is to be rendered operative it is sufficient to remove the chain 22 from the one pair of sprocket wheels and lay it over the other pair of sprocket wheels. It may be done, for example, by removing a pin from the chain so that this can be opened.

The connection between the hollow shaft and the drive shaft requires no servicing, in particular no greasing. In addition, it is not necessary to cover this point of connection by a casing so that the point of connection is quickly and easily accessible when necessary. The change-over from one drive unit to the other may therefore take place, with the construction according to the invention, extremely quickly and without difficulty.

As shown in particular in FIG. 2 the housing 9 bears an arm 23 projecting approximately radially of the drive shaft 1; this arm abuts at one end on a pressure spring 24. The pressure spring abuts with its other end on a stationary part of the machine 25 and extends thereby substantially at right angles to arm 23 (FIG. 2). A limit switch is also connected to the stationary machine part 25, this switch being operatively connected to a control element 27 of the limit switch 26.

When the associated gear unit is coupled with the drive shaft such that it is secured against rotation relative to the drive shaft, the gear unit rotates according to the torque transmitted to the drive shaft, contrary to the effect to the pressure spring 24, more or less at the end of the drive shaft. When a certain torque is exceeded, this rotation will be so great that the control element 27 of the limit switch 26 will be activated and shut down the motor. The entire arrangement, which may be designated as a resilient torque support, therefore serves as a protection against overloading.

The construction of this arrangement is very simple and is made possible in that a gear unit is used which is slightly rotatable about the axis of the drive shaft.

A similar arrangement may be provided for the other drive unit.

In order to prevent the drive unit not coupled with the drive shaft rotating during operation due to the effect of residual friction between hollow shaft and drive shaft a stop 28 which is secured to the machine can be provided, which may, for example, engage on the arm 23 (FIG. 2).

The arrangement according to the invention of two slip-on drive units on opposite shaft ends also has the advantage that during operation of the drive shaft the reserve drive unit not required for the moment can be serviced. This does not require any interruption of operations. It is also an advantage that due to the rotatable mounting of the drive unit on the drive shaft a relative displacement of the drive unit on the drive shaft in the axial direction can easily take place; aging effects, for example of fretting corrosion, which make the removal of the gear unit in the case of customary slip-on gear units much more difficult, do not occur in this case.

The coupling of the hollow shaft and the drive shaft such that they do not rotate relative to each other is preferably carried out by means of sprocket wheels and a chain connecting these. It is, however, also possible to achieve this coupling in another way, for example by positive connections of two coupling elements or by a connecting link inserted through two coupling elements.

I claim:

1. Feeding device comprising a frame, a drive shaft (1) having two ends and two gear units (8) each drivable by a motor, which gear units are able to be connected alternately to the drive shaft such that each may rotate with said drive shaft independently of the other, characterized in that the two gear units are designed as slip-on gear units each having a driven hollow shaft (10), the two ends of the drive shaft (1) each have the hollow shaft (10) of one of the two slip-on gear units mounted around them in a manner permitting relative rotation, the gear units are secured against rotation about the axis of rotation defined by the drive shaft (1), and a rotary couple (17, 20, 22) is provided, such that one of the hollow shafts (10) at a time is connected to the drive shaft (1) whereby the hollow shaft may rotate therewith.

2. Feeding device according to claim 1, characterized in that each hollow shaft (10) bears a first sprocket wheel (17), adjacent to each of which is a second sprocket wheel (20) having the same diameter and the same number of cogs as said first sprocket wheel, said second sprocket wheel being mounted on the drive shaft (1) such that it is secured against rotation relative to the drive shaft, and a roller chain (22) is placed over the adjacent sprocket wheels (17, 20) to connect one hollow shaft (10) and the drive shaft (1) such that they are secured against relative rotation.

3. Feeding device according to claim 2, characterized in that the chain (22) is designed as a duplex chain.

4. Feeding device according to claim 1, characterized in that each hollow shaft (10) is mounted on the end of the drive shaft (1) by means of at least two ball bearings (15, 16).

5. Feeding device according to any of the preceding claims, characterized in that the securing of each gear unit (8) against rotation about the axis of rotation defined by the drive shaft allows a limited rotation of the gear unit (8) contrary to the action of an elastic pressure spring (24) and a limit switch (26, 27) is provided for the motor (7) associated with each gear unit (8), and a connecting means (arm 23) is provided rigidly connected to the gear unit such that the switch is activated by the gear unit or the connecting means when a specific rotation of the gear unit (8) contrary to the action of the elastic pressure spring (24) is exceeded due to a specific torque transmitted from the gear unit (8) to the drive shaft (1) being exceeded.

6. Feeding device according to claim 5, characterized in that an arm (23) is provided on the gear unit (8), which projects at right angles to the axis of rotation of the drive shaft (1) and on which a pressure spring (24) is supported, said pressure spring extending substantially at right angles to the connecting means (arm (23)), its other end abutting on the frame of the feeding device (25), and that the limit switch (26) is supported on the frame of the machine (25) such that the limit switch is activated by the arm (23) when a specific compression of the pressure spring (24) is exceeded.

7. Feeding device according to claim 1, 2 or 3, characterized in that the end portions of the drive shaft (1), to which the hollow shafts (10) of the gear units (8) are attached, have a smaller diameter than the remaining shaft.

* * * * *